US008299922B2

(12) United States Patent  (10) Patent No.: US 8,299,922 B2
Ben-David  (45) Date of Patent: *Oct. 30, 2012

(54) SYSTEM AND METHOD FOR ARTICLE AND PROXIMITY LOCATION

(75) Inventor: Yoav Ben-David, Tel-Aviv (IL)

(73) Assignee: YYY International LLC, North Miami Beach, FL (US)

( * ) Notice: Subject to any disclaimer, the term of this patent is extended or adjusted under 35 U.S.C. 154(b) by 413 days.

This patent is subject to a terminal disclaimer.

(21) Appl. No.: 12/488,865

(22) Filed: Jun. 22, 2009

(65) Prior Publication Data

US 2009/0318189 A1     Dec. 24, 2009

Related U.S. Application Data

(63) Continuation-in-part of application No. 11/559,901, filed on Nov. 15, 2006, now Pat. No. 7,567,177.

(60) Provisional application No. 60/739,025, filed on Nov. 23, 2005.

(51) Int. Cl.
   *G08B 13/14*     (2006.01)
(52) U.S. Cl. ............ 340/568.7; 340/539.13; 340/539.32
(58) Field of Classification Search ............... 340/568.7, 340/539.13, 539.32
   See application file for complete search history.

(56) References Cited

U.S. PATENT DOCUMENTS

| | | | |
|---|---|---|---|
| 6,342,836 B2 | 1/2002 | Zimmerman | |
| 6,522,253 B1 | 2/2003 | Saltus | |
| 6,724,306 B1 | 4/2004 | Parsley et al. | |
| 7,567,177 B2 * | 7/2009 | Ben-David | 340/568.7 |
| 2002/0014955 A1 | 2/2002 | Klitsgaard | |
| 2003/0132842 A1 | 7/2003 | Chia-Yen | |
| 2004/0075554 A1 | 4/2004 | Yang | |
| 2004/0130447 A1 | 7/2004 | Monck | |
| 2004/0246129 A1 | 12/2004 | Goggin | |
| 2004/0252030 A1 * | 12/2004 | Trimble et al. | 340/825.36 |
| 2005/0040774 A1 | 2/2005 | Mueller et al. | |
| 2007/0098407 A1 * | 5/2007 | Hebrank et al. | 398/106 |
| 2007/0155117 A1 | 7/2007 | Wicker | |
| 2009/0143923 A1 | 6/2009 | Breed | |

OTHER PUBLICATIONS

International Search Report of Application No. PCT/IL10/00488 Dated Oct. 21, 2010.

* cited by examiner

*Primary Examiner* — Brent Swarthout

(74) *Attorney, Agent, or Firm* — Pearl Cohen Zedek Latzer, LLP

(57) ABSTRACT

A system and method which enable an airline passenger who is traveling with articles, such as baggage and the like, to easily locate them upon arrival to the airport luggage retrieval point, even among a mass of look-alike baggage articles around it. According to an embodiment of the invention a luggage location unit is described, having a transmitter for transmitting an identifying code, a sensor to sense cargo compartment environment and an indicator unit having a receiver for receiving the identifying code and for indicating that the luggage article is in proximity with the indicator unit. The system may be activated automatically by a light sensor. The system and method according to the invention may be used for other uses such as for locating a vehicle in a parking lot or for keeping a child in a close distance form an adult.

18 Claims, 8 Drawing Sheets

SYSTEM AND METHOD FOR ARTICLE AND PROXIMITY LOCATION

CROSS-REFERENCE TO RELATED APPLICATIONS

This application is a continuation-in-part of prior U.S. application Ser. No. 11/559,901 filed Nov. 15, 2006, now U.S. Pat. No. 7,567,177, which in turn claims the benefit under 35 USC 119(e) from US provisional application No. 60/739,025 filed Nov. 23, 2005 the disclosures of both of which are incorporated herein by reference.

FIELD OF THE INVENTION

Embodiments of the present invention relate to a system especially for airline passengers who are traveling with articles, such as baggage and the like, which may be separated from the passengers for a long period of time and then reconnected when the passengers arrive at their destination.

BACKGROUND OF THE INVENTION

One of the problems encountered by airline travelers is to locate his baggage upon arriving to his destination. Usually, he will face a moving carousel with a mass of baggage articles, from which he needs to find his own baggage. His luggage may also be mistakenly removed by someone else.

U.S. Pat. No. 6,342,836 given to Zimmerman provides a system for detecting the luggage while in the aircraft as well as at the luggage arrives the retrieval point. The transmitter is activated by a complicated flight profile detector to limit the transmission time. U.S. Pat. No. 6,724,306 given to Parsley et al provides a system that indicates to the traveler when the article is approaching him and when it is getting farther away from him, but it does not activate automatically and the large and bulky transmitter which is positioned inside the luggage to protect it.

SUMMARY OF THE INVENTION

It is the object of the present invention to provide a system which enables an airline passenger who is traveling with articles, such as baggage and the like, to easily locate them at the luggage retrieval point, even among a mass of look-alike baggage articles around it. It would be appreciated however that other uses to the system may be found according to some embodiments of the invention, such as for locating a vehicle in a parking lot and for keeping a child in a close distance from an adult.

According to one embodiment of the present invention A luggage locating system is described. The luggage location system according to one embodiment may comprise a luggage location unit having a transmitter for transmitting an identifying code, a sensor to sense cargo compartment environment; and an indicator unit having a receiver for receiving the identifying code and for indicating receipt of said identifying code to indicate that the luggage location unit attached to the baggage article is in proximity with the indicator unit. According to an embodiment of the present invention, the transmitter may be equipped with a sensor to sense if it is situated in a cargo compartment environment, using sensors such as a light intensity sensor, acoustic sensor, altitude sensor and the like. When said sensor is a light intensity level sensor it can also be coupled with a filter. The location unit according to some embodiments of the present invention may further comprise at least one Light Emitting Diode (LED) to emit light upon arrival to a luggage retrieval point to allow easy detection of the luggage article.

It is a farther object of the present invention to provide a system which is automatically activated, easy to use, easy to install and inexpensive.

These and other advantages of the present invention will become apparent upon reading the following detailed descriptions and studying the various figures of the drawings.

BRIEF DESCRIPTION OF THE DRAWINGS

The present invention will become fully understood from the detailed description given herein below and the accompanying drawings, which are given by way of illustration only and thus not limitative of the present invention, and wherein.

DETAILED DESCRIPTION OF EMBODIMENTS OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided, so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The methods and examples provided herein are illustrative only and not intended to be limiting.

Figure 1:
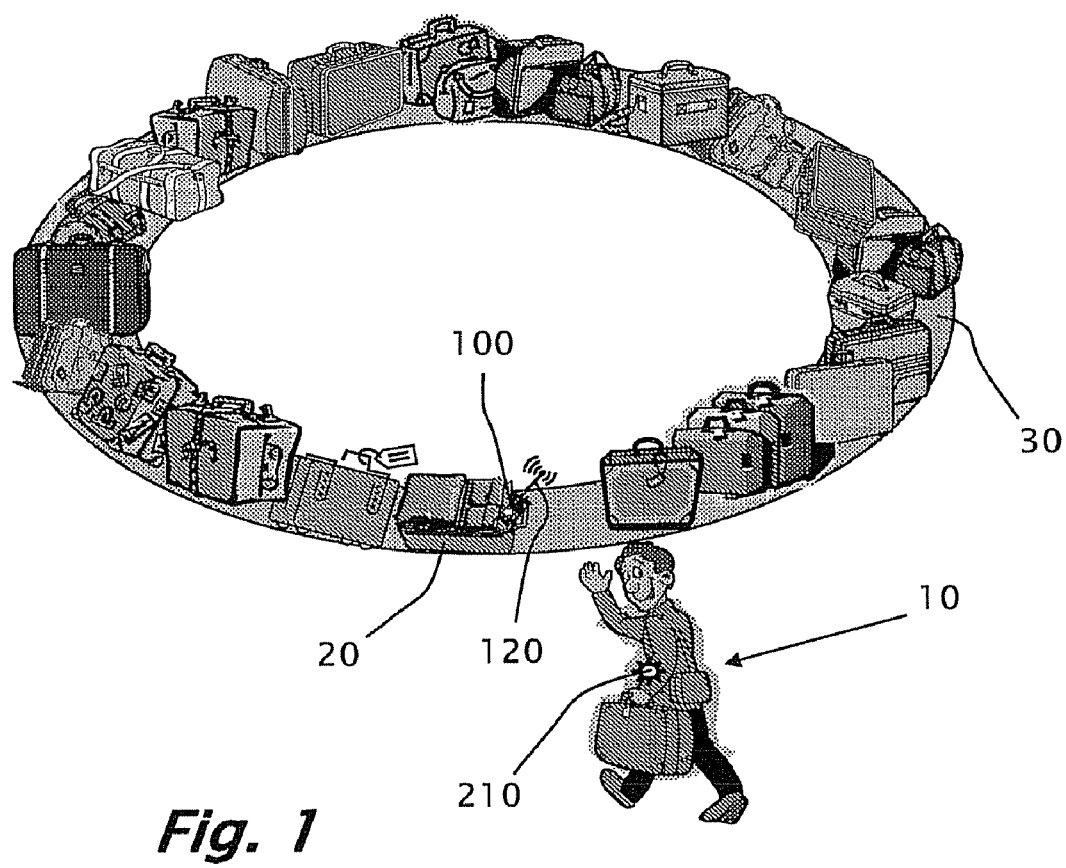
FIG. 1 is a schematic perspective view of a carousel loaded with passengers' luggage articles where embodiments of the system of the present invention may operate.

With reference to FIGS. 1-3 and 6-8, embodiments of the present invention comprise a transmitting unit 100 which is attached to a traveling article such as a suitcase 20. The transmitting unit 100 is activated by light and/or acoustic sensors that sense that the suitcase 20 has emerged from the aircraft. When the light intensity detected is above the preset threshold and/or a change in the acoustic noise level, relative to the steady noise in the aircraft, is detected, and/or altitude is detected, they activate the transmitter 100, which starts sending a coded RF signal via antenna 120. Antenna 120 is shown in FIG. 1 as a long antenna for illustration purposes only, and is preferably embodied as part of the printed circuitry for durability and other reasons. In the case of a light sensor, the threshold is set to detect at least the light level of an airport luggage retrieval point halls level. Optionally, when the transmitter is activated, the indicator led 120 is turned on. Optionally, said light sensor can be coupled with a filter. In the cargo compartment of the aircraft lights might be turned on, for example, yellow lights. Coupling the light sensor with a blue filter, for example, can block this light from the sensor and thus still detect it as being inside the cargo compartment of the aircraft.

Other sensors, such as an altitude sensor or any other sensor known in the art, can also be used to detect the luggage location. In yet another embodiment of the present invention a temperature variation sensor may be used. The temperature variation sensor may be set to stop the operation of the transmitter when detecting a settable decrease in surroundings temperature and initiate the operation of the transmitter upon detection of settable increase in the surroundings temperature to a temperature in a range typical to airports.

Transmission is roughly limited in distance to the length of an airport carousel, which is about 10 meters. The RF frequency used is in the range of 400-500 MHz, designated for common electronic devices, and is safe to use in airports as well. The preferred embodiment of this invention utilizes a basic frequency of 433 MHz, which is given her by way of example, not limitation. Another possible range is 900-950 MHz or any other range. Typically, transmission will be at a low power and below allowed levels.

The transmitter can be 64 bits deep which enables $2^{64}$ possible code IDs. This assures that practically, all code IDs will be unique.

Optionally, the transmitter can change the time of transmission, the time interval between transmissions and the code ID according to the country or region where it is situated. This can be preset manually by the user or change automatically by detecting the transmission frequencies used in said location.

The transmitter in one embodiment is adapted to adjust one or more parameters from a list of parameters comprising: time of transmission, time interval between transmissions, identifying code and frequency of transmission, according to the region where it is situated, by detecting the transmission frequencies used in said region.

In a credit card size transmitter, a battery can prevail for several tens of hours of continuous operation. In a larger housing, using more powerful batteries, it can last for several weeks of continuous operation. This information is given here by way of example, not limitation, and any type of battery or batteries can be used.

The receiving unit 200 is powered on by a user 10. When detecting and identifying the transmitted code, it turns on one or more indicators such as visual indicators, and/or audio indicators and/or vibrating indicator, to indicate to user 10 that his baggage is arriving or has arrived.

Referring now to FIG. 1, a view of the loaded carousel 30, where the system of the present invention operates, is given. The carousel 30 is loaded by a wide variety of baggage articles, many of which look alike. Transmitter 100 has been active since the light and/or noise and/or temperature detectors have activated it. Transmitter 100 transmits its ID code at a preset time interval, for example: every 20 milliseconds. The optional light indicator 120 has been turned on at activation time.

The user/traveler 10 has turned on the receiving unit, and when it detects and identifies the signal emitted from the transmitting unit 100, designated indicators advise the user 10 that his luggage is arriving. These indicators can be one or any combination of a light, sound and a vibrator. As transmitter 100 gets closer to user 10, the indication gets stronger as well and if the transmitter 100 gets farther away from user 10, the indication gets weaker. The light may change in intensity and/or flicker at a changing frequency.

The transmitting unit 100 can also serve as a luggage tag, and can be made of a durable plastic material which is also strong and flexible, and onto which the electronic circuitry can be printed. Such materials are now widely used in the industry, for example, Glass Epoxy.

Figure 2:
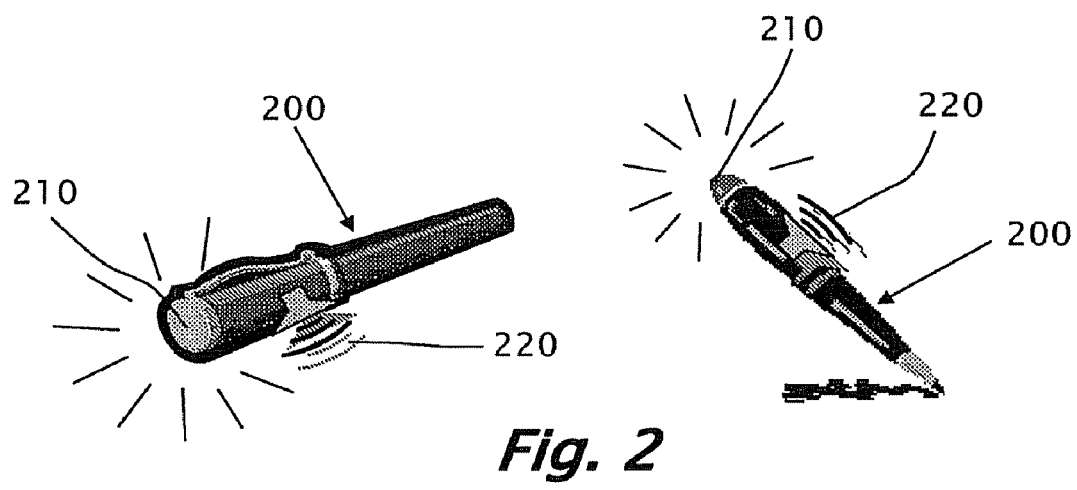
FIG. 2 shows a pen embodiment of a receiver unit according to embodiments of the present invention.

Referring now to FIG. 2, one embodiment of a receiving unit 200 is described. In this embodiment the receiver is integrated into a pen like housing. It may also serve as a pen. It can have an audio speaker 220 built into it. Another option is a light source 210 such as a led built into it. This light can be optionally used by the user as a flash light. It can also have a vibrator built into it. As described before, the light and/or sound and/or vibration will be turned on when it identifies the received code ID. It will get stronger as transmitter 100 gets closer to user 10, and will get weaker as transmitter 100 gets farther away from user 10.

Figure 3:
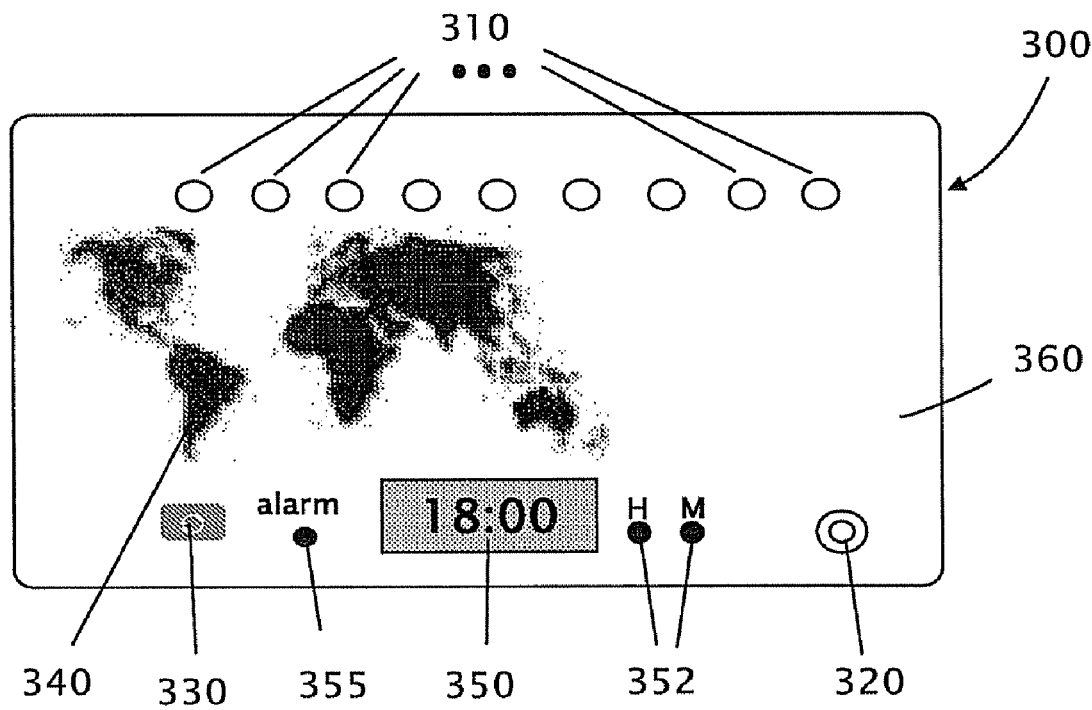
FIG. 3 shows a credit card like embodiment of a receiver according to embodiments of the present invention.

Referring to FIG. 3, another embodiment of a receiving unit 300 is described. In this embodiment the receiver is integrated into a credit card like housing. It is activated by user 10 pushing upon button 330. It can have an audio speaker 320 built into it. Another option is a light source 320 such as a led built into it. This can also be implemented as a group of LEDs 310. The LEDs may be of various colors. As transmitter 100 gets closer to user 10 more lights will be turned on, and as transmitter 100 gets farther away from user 10 they will be turned off. One or more LEDs can be optionally used by the user as a flash light. It can also have a vibrator built into it. As described before, the light and/or sound and/or vibration will get stronger as transmitter 100 gets closer to user 10, and will get weaker as transmitter 100 gets farther away from user 10.

It may as well serve as a clock showing the time at various cities around the globe, for example, by touching the graphical location on the map. The time is shown for example, in a LCD display 350. An alarm clock can also be incorporated and set by buttons 352 and 355. The time can also be set by buttons 352 and 355. Another option is to add a calculator 360 which will also use the LCD display 350.

In another embodiment of the present invention the transmitter/receiver system can be used for child monitoring, except that the proximity indication is the other way around: as the child gets farther away from his supervisor, the indication gets stronger. This can be implemented in the same system by a switch that inverts the indication intensity.

In yet another embodiment of the present invention, if the receiver controls more than one incoming code IDs, it will have an indication as to which article it is detecting at a given time. This can be done by different sounds, extra sets of LEDs, different color LEDs and so on and so forth.

Figure 3A:
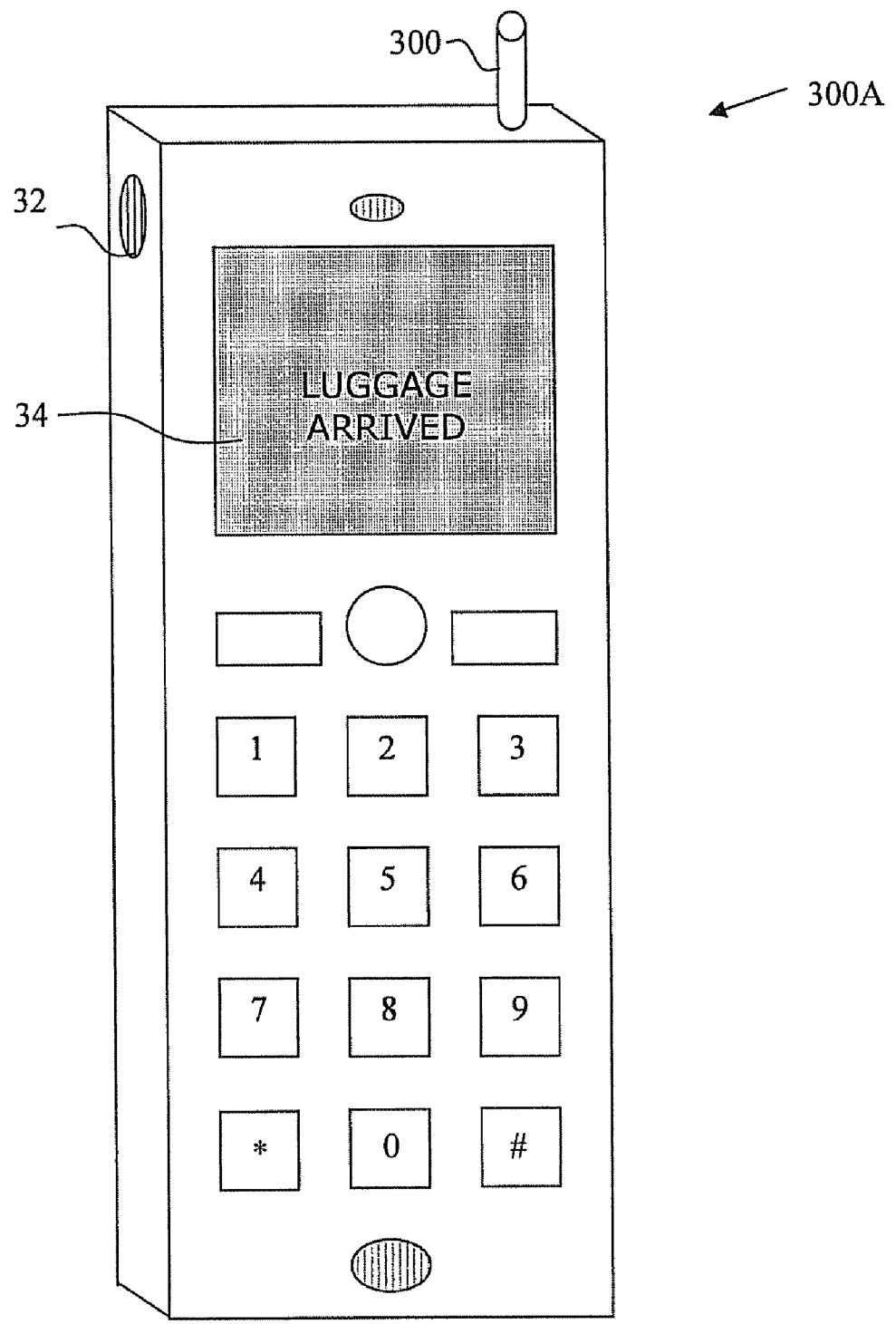
FIG. 3A shows another embodiment of a receiver according to embodiments of the present invention.

Referring now to FIG. 3A, according to one embodiment of the present invention, receiver 300 may be embedded within a cellular phone 300A. Cellular phone 300A may comprise of a receiver 300 adapted to identify transmission from transmitter (not shown) attached to user's traveling article (not shown). Receiver 300 may be actively connected to internal devices and functionalities within cellular phone 300A and utilize them upon receipt of a signal from transmitter. According to one embodiment of the present invention, receiver 300 may be connected to speaker 32 in order to allow audible indication when a signal transmitted from a transmitter on user's article is received by receiver 300. In yet another or additional embodiment of the present invention, receiver 300 may be actively connected to display 34 of cellular phone 300A. Display 34 may be adapted to provide a visual indication that a signal from transmitter is received by receiver 300. In another or additional embodiment of the present invention receiver 300 may be actively connected to a vibration device (not shown) comprised within cellular phone 300A. Vibration device may be adapted to indicate, by vibrating, that a signal from transmitter has been received by receiver 300. In yet another embodiment of the present invention, the transmitter may be adapted to ring a pre-selected phone number, upon arrival at the retrieval point. The phone number dialed by the transmitter may be associated with cellular phone 300A and thus may provide a visual, voice and/or vibration indication that traveling article has arrived at the retrieval area. It may be appreciated that according to other embodiments of the present invention the user may call a cellular phone number associated with the location unit to initiate the production of an indication from the location unit.

Figure 4:
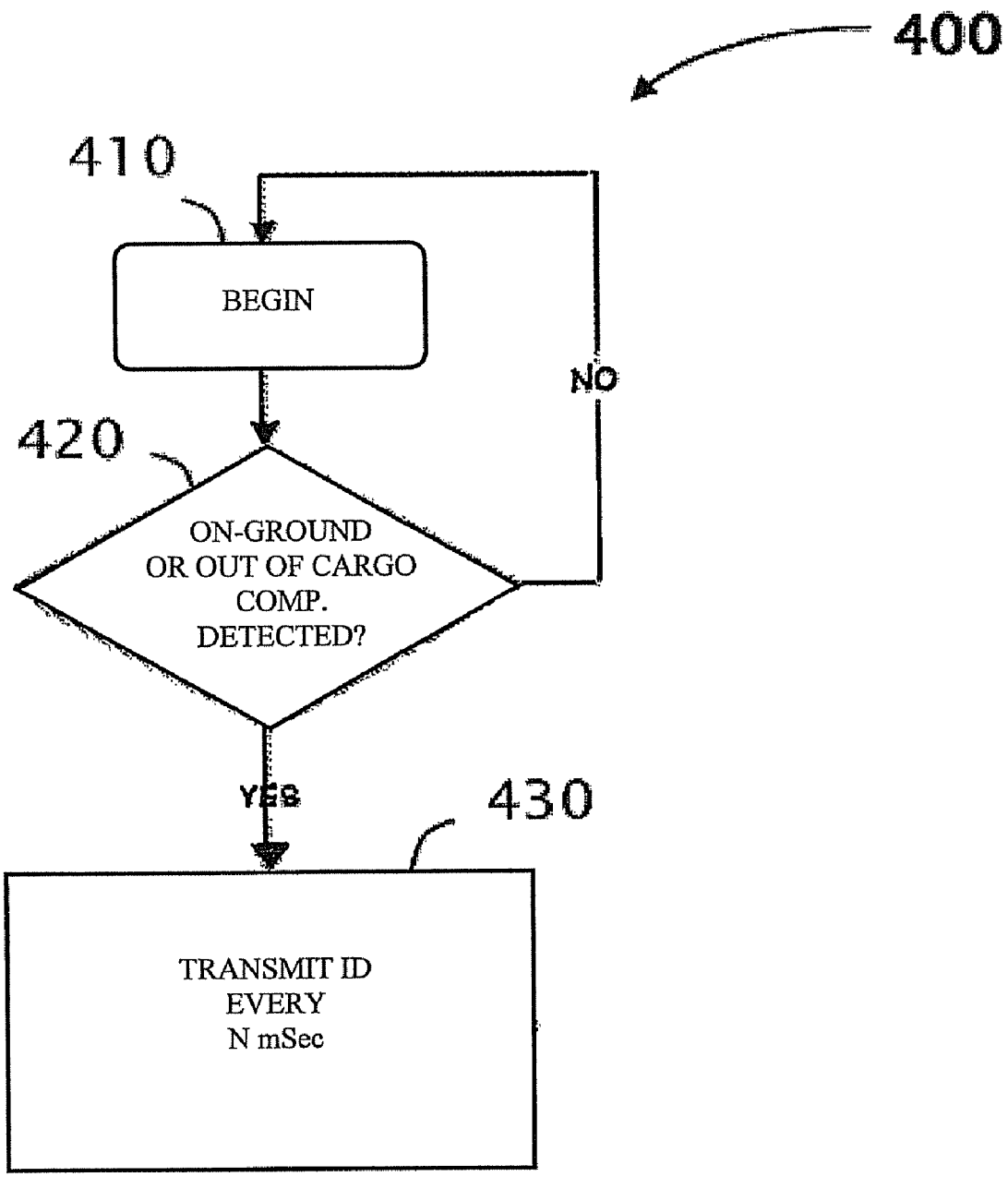
FIG. 4 is a block diagram of the logic of operation of a transmitter unit according to embodiments of the this invention.

Referring now to FIG. 4, a block diagram 400 of the transmitting unit is described. Before the unit is activated the unit operates at power saving mode. At this mode only the light and/or acoustic and/or temperature variation detectors, represented by block 410, draw energy from the battery. If the light detected level is below a preset threshold, and/or no changes detected in the noise level, and/or the temperature decreases below a predetermined temperature, (block 420) nothing happens. If the light detected level surpasses the preset threshold and/or changes are detected in the noise level and or the temperature measured increases beyond a predetermined temperature (block 420), the transmitting circuitry is activated at block 430. The acoustic noise detector ignores the constant noise levels occurring during the flight inside the cargo compartment of an aircraft. If it detected a change in the noise levels, except for brief changes (that may occur during the flight, such as the folding of the wheels), it activates the transmitter. The transmitter transmits a code ID at a preset time interval, for example, every 20 milliseconds.

This circuitry may also include a time limit which can be optionally preset by the user. This time limit will activate the light and/or noise detectors, only after the preset time is passed. According to yet another or additional embodiment of the present invention, transmitting unit 100 may comprise a delay mechanism in which a time limit may be presetable by user 10 to delay the transmission of signals from the transmitting unit 100. User 10 may preset a time limit to delay the transmission of signals from transmitter 100 for a period of time beginning upon sensing of a change in the environment typically indicative of the emerging from the cargo compartment of an aircraft to the airport environment, such as a change in noise level or in light detected by light sensor. The delay in initiating transmission of signals may be preset to the time typically required to unload the luggage from an aircraft's cargo compartment and transfer it to the luggage retrieval area in an airport.

Figure 5:
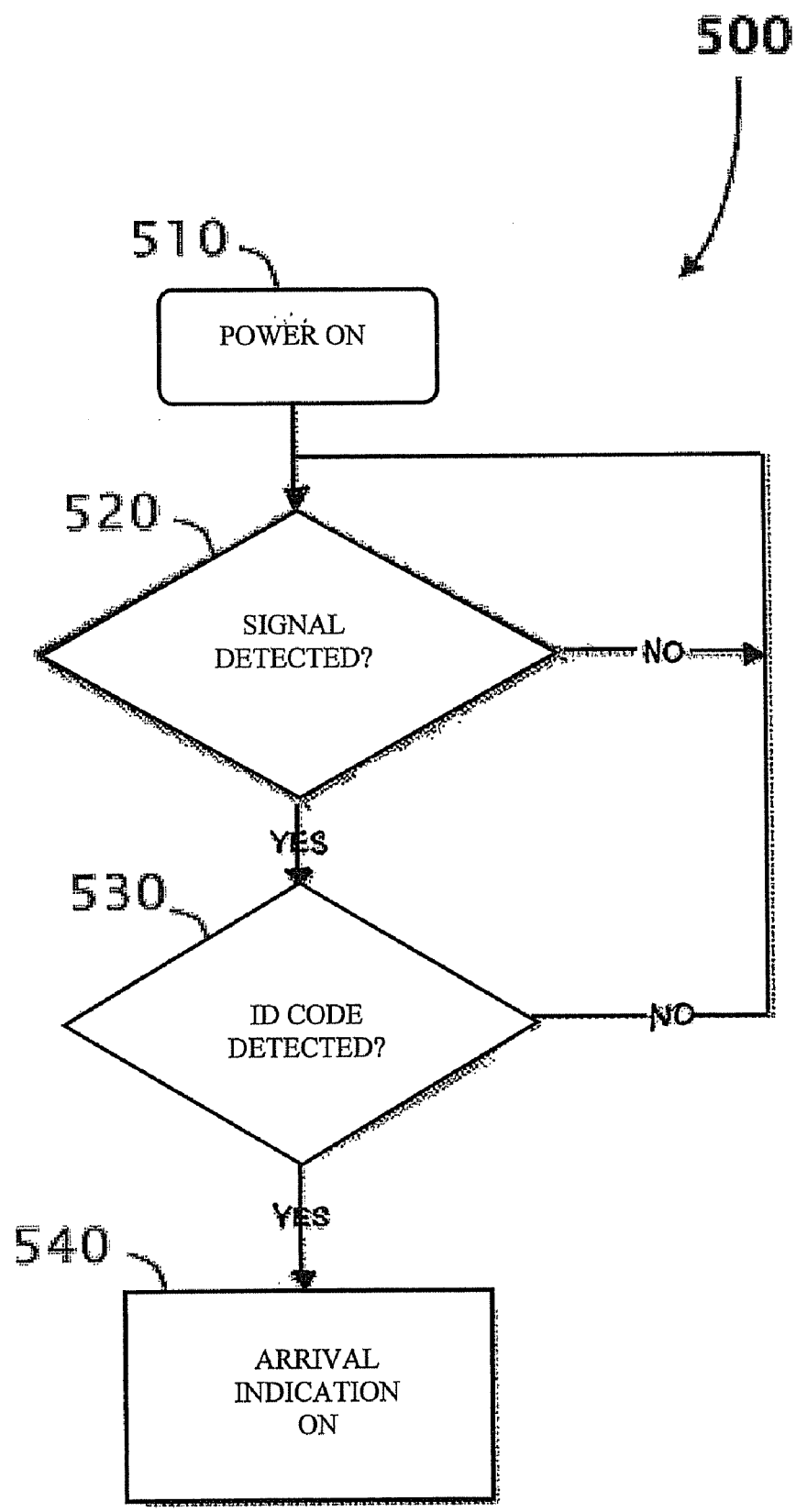
FIG. 5 is a block diagram of the logic of operation of a receiver unit according to embodiments of the this invention.

Referring now to FIG. 5, a block diagram 500 of the receiving unit is described. The unit is activated by the user at block 510. The receiver listens to incoming RF signals at block 520. When it detects such a signal, it tries to identify the transmitted code ID at block 530. If the specific code ID is detected, designated indications are turned on at block 540: light indicators and/or sound indicators and/or vibrating indication. The strength of the indication is directly proportional to the strength of the incoming RF signal.

Figure 6:
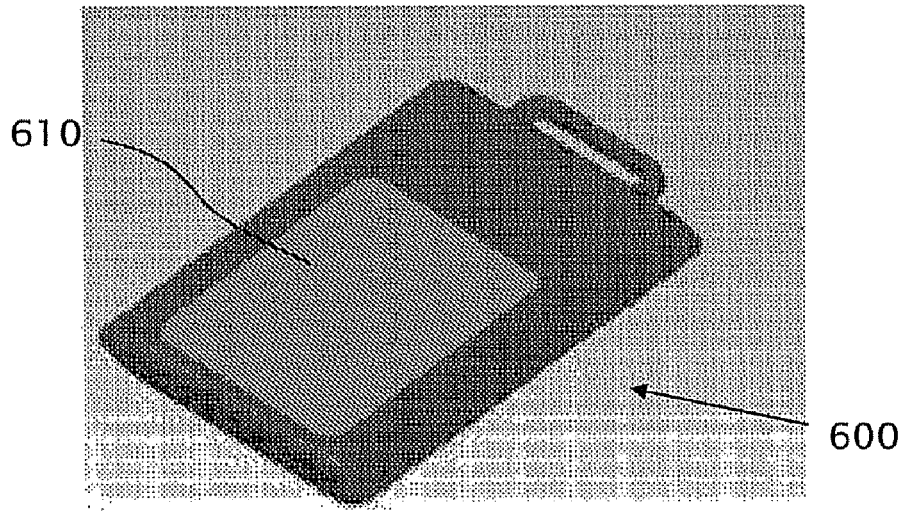
FIG. 6 shows an example of a transmitter according to embodiment of the present invention.

FIG. 6 shows an example of a transmitter 600 of an embodiment according to the present invention. In this example the transmitter also has a label are 610. Both transmitter 600 and label 610 can each come in assorted colors to ease the identification process.

Figure 6A:
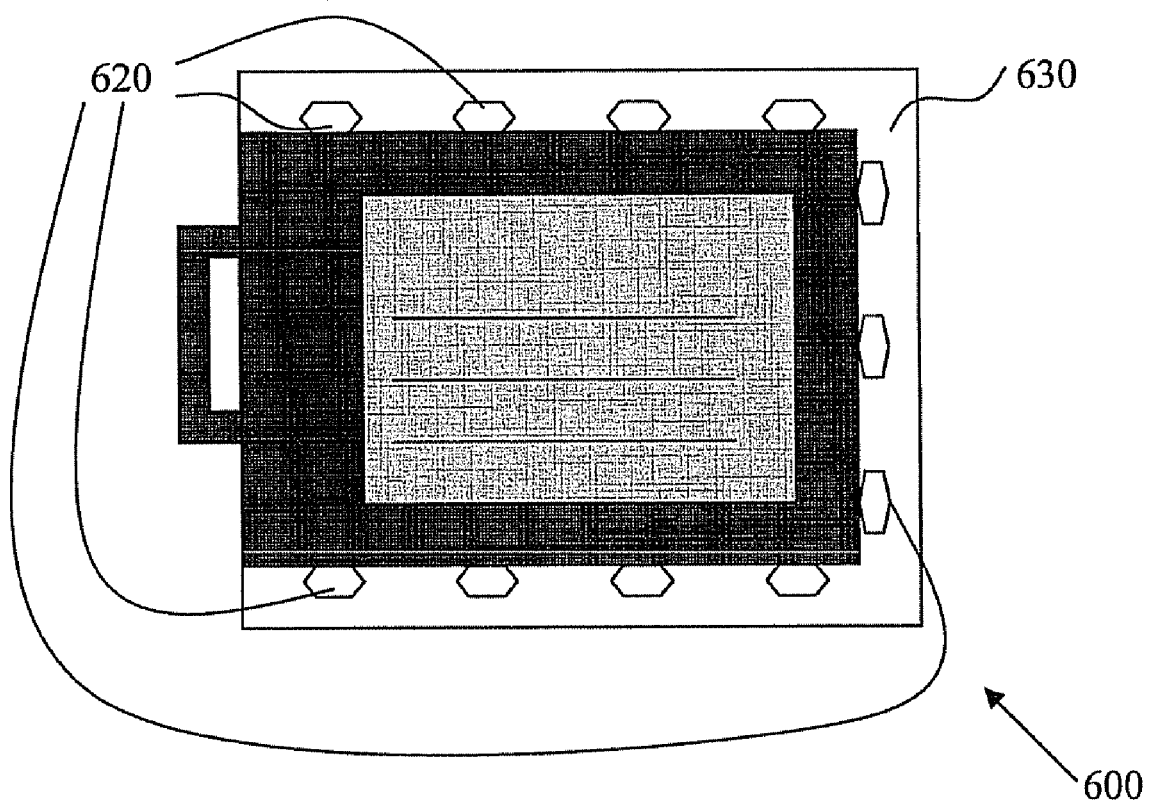
FIG. 6A shows another example of a transmitter according to another embodiment of the present invention.

FIG. 6A illustrates another embodiment of a transmitting unit 600 according to one embodiment of the present invention. Transmitting unit 100 may comprise one or more Light Emitting Diodes (LEDs) 620. According to one embodiment of the present invention, LEDs 620 may be located in the circumference of transmitting unit 600 which may be attached to a traveling article such as suitcase 20 [depicted in FIG. 1]. When the transmitting unit 600 is activated so as to transmit a signal to a receiving unit, LEDs 620 may start emitting light in order to allow easy visual detection of traveling article 20. According to some embodiments of the present invention, LEDs 620 may be of different colors and may be preprogrammed to emit light in different sequences in order to allow easy detection of traveling article 20 by user 10 [depicted in FIG. 1] even amongst several other such transmitting tags in the same vicinity.

In yet another embodiment of the present invention, LEDs 620 may be embedded in a transparent strip 630 located at one or more edges of transmitting unit 600 Transparent strip 630 may allow light emitted by LEDs 620 to be visible from substantially all directions of transmitting unit 600.

Figure 7:
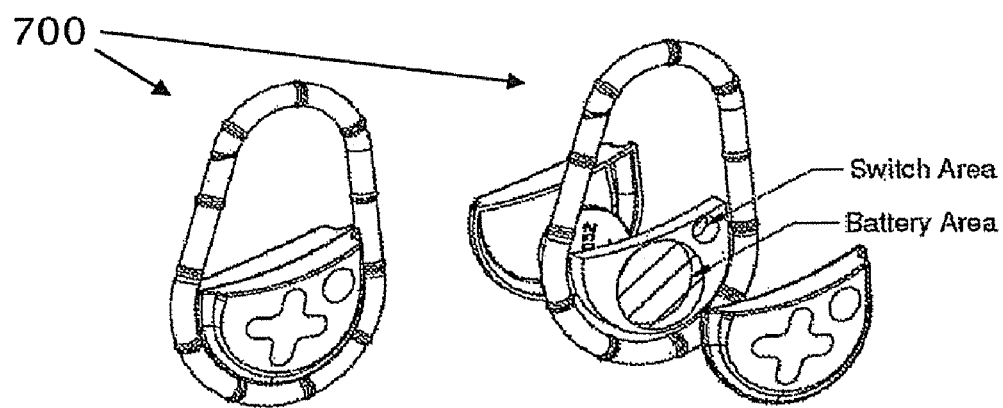
FIG. 7 shows another example of a receiver according to embodiments of the present invention, shaped as a key chain.
Figure 7:
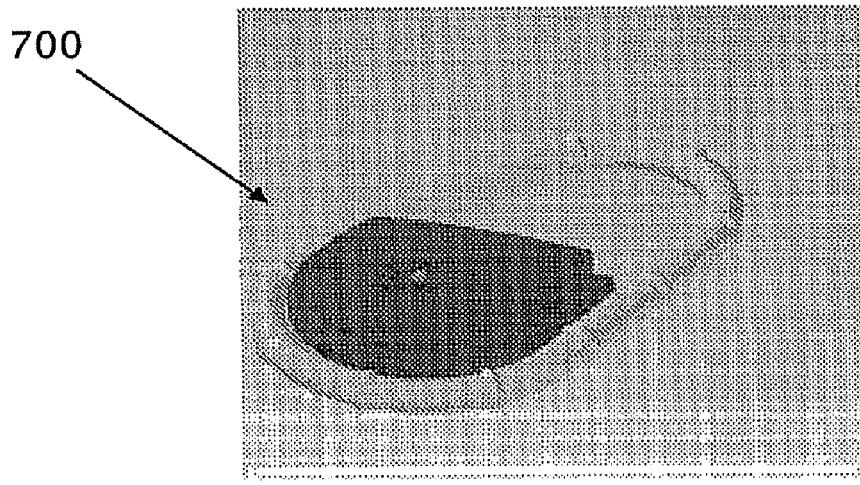

FIG. 7 show another example receiver 700 of an embodiment according to the present invention, shaped as a key chain.

Figure 8:
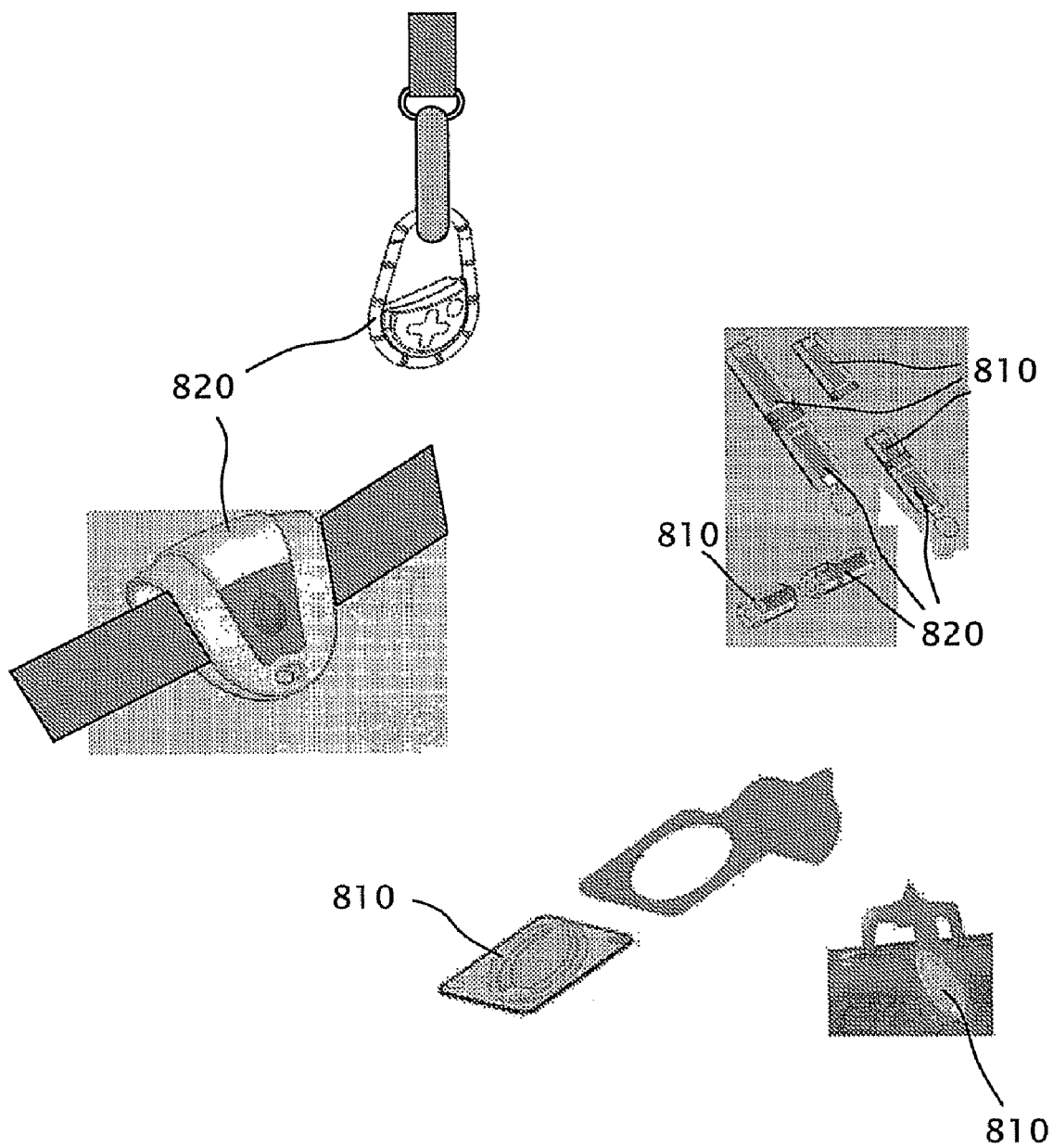
FIG. 8 shows assorted example embodiments of transmitters/receivers according to embodiments of the present invention.

FIG. 8 show assorted example embodiments of transmitters 810 and receivers 820 according to the present invention.

In yet another embodiment of the present invention, if the receiver is integrated into a cellular phone, whereas the transmitter has the capability to ring a pre-selected phone number, upon the receiver arrival the retrieval point.

In still another embodiment of the present invention, if the receiver is placed on the baggage and the user has the transmitter.

While the present invention has been described in terms of a proximity communication system and structure as well as structures and methods for verifying the proximity and location of baggage, one skilled in the art will realize that the structure and techniques of the present invention can be applied to many similar devices. The present invention may be applied in any situation where proximity, identification and location of objects are needed.

Although the present invention has been described with reference to the preferred embodiment and examples thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the following claims.

What is claimed is:

1. A luggage locating system comprising:
  a luggage location unit having a transmitter for transmitting an identifying code and having a housing which is durable;
  a sensor to sense cargo compartment environment; and
  an indicator unit having a receiver for receiving said identifying code and for indicating receipt of said identifying code to indicate that said luggage location unit is in proximity with said indicator unit,
  wherein said sensor is at least one sensor from a list of comprising a light intensity level sensor and a temperature variation sensor; and
  wherein said transmitter is adapted to adjust one or more parameters from a list of parameters comprising: time of transmission, time interval between transmissions, identifying code and frequency of transmission, according to the region where it is situated, by detecting the transmission frequencies used in said region.

2. The luggage locating system of claim 1, wherein said light intensity level sensor is coupled with a filter to reduce the light energy sensed by said light intensity level sensor in a defined range of wavelengths.

3. The luggage locating system of claim 1 wherein said location unit further comprises a delay mechanism adapted to delay the transmission of said identifying code for a preset period of time after sensing a change in light intensity indicating departure of said luggage location unit from said cargo compartment environment.

4. The luggage locating system of claim 1, wherein the receiver is integrated into a cellular phone, and whereas the transmitter has the capability to call a pre-selected phone number, when sensing departure of said luggage location unit from said cargo compartment environment.

5. The luggage locating system of claim 1, and wherein said receiver is integrated into a cellular phone, and is actively connected to a speaker of said cellular phone to provide an audible indication when a signal is received from said transmitter.

6. The luggage locating system of claim 1, and wherein said receiver is integrated into a cellular phone, and is actively connected to a display of said cellular phone to provide a visual indication when a signal is received from said transmitter.

7. The luggage locating system of claim 1, wherein said receiver is programmed to sense the amplitude of the incoming transmitted identifying code and provide an indication which is directly proportional to said amplitude.

8. A luggage locating system comprising:
at least two luggage location units, each comprising:
a transmitter for transmitting an identifying code uniquely identifying said luggage location unit and having a housing which is durable; and
a sensor to sense cargo compartment environment; and
an indicator unit having a receiver for receiving said identifying codes and for indicating receipt of said identifying codes to indicate that at least one of said luggage location units is in proximity with said indicator unit,
wherein said sensor is at least one sensor from a list of comprising a light intensity level sensor and a temperature variation sensor; and
wherein said transmitter is adapted to adjust one or more parameters from a list of parameters comprising: time of transmission, time interval between transmissions identifying code and frequency of transmission, according to the region where it is situated, by detecting the transmission frequencies used in said region.

9. The luggage locating system of claim 8, wherein said indicator unit includes means to indicate which location unit is currently in communication with the indicator unit.

10. The luggage location system of claim 1, wherein said transmitter comprises at least one LED adapted to start emitting light when said transmitter starts to transmit a signal.

11. The luggage locating system of claim 10 wherein said at least one LED is embedded within a transparent strip located on the at least one edge of said transmitter.

12. The luggage location system of claim 1 having at least two LEDs, wherein said at least two LEDs are of different colors.

13. The luggage location system of claim 12 wherein said at least two LEDs are preprogrammed to emit light in different sequences.

14. A method for location a luggage article comprising:
attaching a location unit to a luggage article,
transmitting an identifying code by transmitter located within said location unit, upon sensing of a change in the environment indicative of emerging from a cargo compartment of an aircraft to an airport environment; and
providing an indication at indicator unit upon receipt of said identifying code transmitted by said transmitter; and
adjusting one or more parameters from a list of parameters comprising: time of transmission, time interval between transmissions, identifying code and frequency of transmission, according to the region where it is situated, by detecting the transmission frequencies used in said region.

15. The method of claim 14 wherein a time mechanism is preset to delay the transmission of said identification code, prior to attaching said location unit to said luggage article.

16. The method of claim 14 wherein upon initiation of transmission of identification code by a transmitter, LEDs located at the circumference of said location unit emit light.

17. The method of claim 16 wherein said LEDs emit light in a preset sequence.

18. The luggage locating system of claim 2, wherein said range of wavelengths is of yellow light.

* * * * *